Jan. 15, 1963 J. D. RICHEY 3,073,654
BEARING ASSEMBLY
Filed Nov. 16, 1959
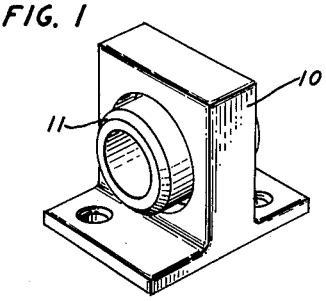
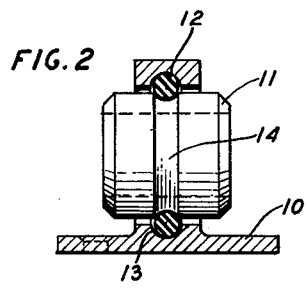
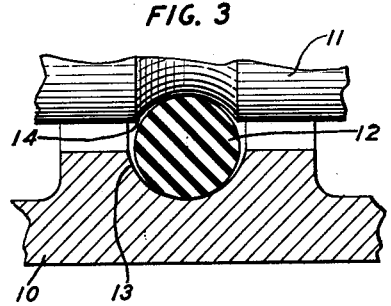
INVENTOR
J. D. RICHEY
BY John C. Morris
ATTORNEY United States Patent Office 3,073,654
Patented Jan. 15, 1963

3,073,654
BEARING ASSEMBLY
James D. Richey, Morristown, N.J., assignor to Bell Telephone Laboratories, Incorporated, New York, N.Y., a corporation of New York
Filed Nov. 16, 1959, Ser. No. 853,195
1 Claim. (Cl. 308—26)

This invention relates to a bearing assembly and, more particularly, to such an assembly in which the bearing or sleeve is yieldably mounted in its housing or pillow block.

A rotatable or reciprocable shaft mounted in a plurality of bearings requires that these bearings be in alignment to avoid undue wear, shaft whipping, etc. Careful mounting of bearing assemblies will achieve substantial alignment. The remaining small adjustments necessary to accomplish alignment may be had by mounting the bearing within its housing so that suitable relative movement between the two is possible. With small or medium diameter shafts, a yieldable mounting between the housing and the bearing will serve this purpose. Such bearing assemblies have been called "self-aligning." The bearing assembly of this invention is of the kind noted.

An object of this invention is to improve the mounting of shaft bearings.

A more specific object of this invention is to provide for self-alignment of shaft bearings.

Another object of this invention is to inhibit shock and vibration effects in shaft bearings and their mountings.

Further objects of the invention are to attain a simple, compact structure and make construction easier than heretofore while maintaining a design of high quality.

A structure illustrative of the features of this invention comprises a bearing assembly including an internally grooved housing, an externally grooved bearing within the housing, and a ring of rubber or the like between the two and seated in the grooves. The relative dimensions of the housing, the bearing, the grooves, and the ring are such that the ring is compressed in the direction of the bearing radius and expanded in the direction of the bearing axis. This arrangement provides good lateral rigidity in the assembly while allowing sufficient angular deflection for self-alignment. Vibration insulation also results from the noted structure.

A feature of this invention resides in the noted structural relations, whereby the "rubber" ring is circular in section and has an undeformed cross-sectional diameter slightly greater than the distance between the bottoms of the respective grooves. These grooves have radii slightly greater than the undeformed cross-sectional radius of the ring. Thus, the ring is radially squeezed when the parts are assembled. Since the rubber or like material from which the ring is made is essentially incompressible but easily deformable, it flows in a direction axially to the bearing. Thus, the section of the ring is distorted, that is, flattened slightly. The movement of the deformable material in the axial direction is not sufficient to completely fill the sides of the grooves. Therefore, when the need arises for angular movement between the bearing and its mounting to allow for alignment with the shaft, space is available to accommodate the further distorted ring material.

Other and further objects and features of this invention will appear more fully and clearly from the ensuing description of an illustrative embodiment thereof taken in connection with the appended drawings, in which:

FIG. 1 is a perspective view of the bearing assembly of this invention;

FIG. 2 is a view partly in section to show internal structure; and

FIG. 3 is an enlarged fractional section to show certain dimensional relations.

As illustrated in FIG. 1, the assembly of this invention comprises a housing or pillow block 10 and a bearing or sleeve 11. The mounting ring 12, not shown in FIG. 1, may be seen in section in FIGS. 2 and 3.

The ring 12 may be of rubber or a rubber-like material that is essentially incompressible but easily deformable. This ring in its undeformed condition, that is, before assembly with the other parts, is circular in section.

A groove 13 in the housing and a juxtaposed facing groove 14 in the sleeve accommodate the ring 12 in the compeleted assembly. These grooves are in section arcs of circles. The dimensions of the housing 10, the sleeve 11, and their respective grooves 13 and 14, are such that the ring 12 is squeezed in a radial direction when the parts are assembled. This is accomplished by making the distance between the bottoms of the grooves less than the cross-sectional diameter of the undistorted ring. Furthermore, the radius of each groove is greater than the cross-sectional radius of the undistorted ring. The assembled ring thus has a cross-sectional shape that is essentially oval with the longer diameter parallel to the bearing axis.

As may be seen in FIG. 3, the ring 12 does not completely fill the grooves 13 and 14. Thus, if the sleeve 11 is slightly tilted by a shaft journaled therein in order to preserve alignment, there is space to accommodate further unsymmetrically deformed mounting ring material.

The novel structural relations of the housing ring and sleeve, by virtue of which the ring is radially squeezed, make for good lateral stability. The spaces at the sides of the grooves allow the mounting ring to roll slightly with a tilting sleeve, as well as to provide space for ring material that is displaced due to further deformation.

Although the shapes and the sizes of the parts as illustrated in the drawing may not conform exactly to the dimensional requirements of the bearing assembly, they qualitatively indicate these characteristics.

What is claimed is:

A bearing assembly comprising a housing having a circular groove of arcuate section in its inner surface, a bearing within the housing and having a like circular groove of arcuate section in its outer surface, said grooves being juxtaposed, and a solid rubber-like mounting ring of circular section in said grooves thereby supporting the bearing in the housing, the material of said ring being substantially incompressible but readily deformable and having an undeformed cross-sectional diameter slightly greater than the distance between the bottoms of the respective grooves, said grooves each having a radius slightly greater than the undeformed cross-sectional radius of the ring and sufficiently greater than the major sectional radius of the deformed ring to leave clearance on either side of said ring to accommodate the material of the ring that may be further deformed by angular movement between the bearing and the housing.

References Cited in the file of this patent
UNITED STATES PATENTS

| | | |
|---|---|---|
| 1,980,580 | Gilmore | Nov. 13, 1934 |
| 2,439,269 | Shafer | Apr. 6, 1948 |
| 2,525,911 | Keene et al. | Oct. 17, 1950 |
| 2,653,063 | Arndt et al. | Sept. 23, 1953 |

FOREIGN PATENTS

| | | |
|---|---|---|
| 575,839 | France | Apr. 30, 1924 |